US011267981B2

(12) United States Patent
Duncan et al.

(10) Patent No.: US 11,267,981 B2
(45) Date of Patent: Mar. 8, 2022

(54) 3-D PRINTED DEVICES FORMED WITH CONDUCTIVE INKS AND METHOD OF MAKING

(71) Applicants: Massachusetts Institute of Technology, Cambridge, MA (US); President and Fellows of Harvard College, Cambridge, MA (US)

(72) Inventors: Bradley P. Duncan, Sandwich, MA (US); Maxwell E. Plaut, Cambridge, MA (US); Theodore H. Fedynyshyn, Sudbury, MA (US); Jennifer A. Lewis, Cambridge, MA (US)

(73) Assignees: Massachusetts Institute of Technology, Cambridge, MA (US); President and Fellows of Harvard College, Cambridge, MA (US)

(*) Notice: Subject to any disclaimer, the term of this patent is extended or adjusted under 35 U.S.C. 154(b) by 0 days.

(21) Appl. No.: 16/370,210

(22) Filed: Mar. 29, 2019

(65) Prior Publication Data
US 2019/0300741 A1  Oct. 3, 2019

Related U.S. Application Data

(60) Provisional application No. 62/651,830, filed on Apr. 3, 2018.

(51) Int. Cl.
*C09D 11/52* (2014.01)
*C09D 11/037* (2014.01)
(Continued)

(52) U.S. Cl.
CPC ............ *C09D 11/52* (2013.01); *B29C 64/106* (2017.08); *B33Y 10/00* (2014.12); *B33Y 70/00* (2014.12);
(Continued)

(58) Field of Classification Search
CPC ......... C09D 11/52; B33Y 10/00; B33Y 70/00; B33Y 80/00; B29C 64/106; B29C 64/112; B29C 64/118; B29C 64/124
See application file for complete search history.

(56) References Cited

U.S. PATENT DOCUMENTS

| 7,485,366 B2 | 2/2009 | Ma et al. | |
| 2012/0232206 A1* | 9/2012 | Wu | ........................ C09D 11/322 524/440 |

(Continued)

FOREIGN PATENT DOCUMENTS

| CN | 103756236 A | 4/2014 |
| CN | 103980591 A | 8/2014 |

(Continued)

OTHER PUBLICATIONS

N,N-Dimethylformamide, Feb. 27, 2001, Sigma-Aldrich, https://www.sigmaaldrich.com/content/dam/sigma-aldrich/docs/Sigma/Product_Information_Sheet/d4254pis.pdf (Year: 2001).*

(Continued)

*Primary Examiner* — Jasper Saberi
(74) *Attorney, Agent, or Firm* — Nelson Mullins Riley & Scarborough LLP; Reza Mollaaghababa

(57) ABSTRACT

A 3-D printed device comprising one or more interconnect structures, the interconnect structures comprising a plurality of conductive particles and one or more diblock or triblock copolymers; the diblock or triblock copolymers having an A-B, A-B-A, or A-B-C block-type structure in which the A-blocks and C-blocks are an aromatic-based polymer or an acrylate-based polymer and the B-blocks are an aliphatic-based polymer. These 3-D printed devices may be formed using a method that comprises providing a conductive ink composition; applying the conductive ink composition to a substrate in a 3-D solvent cast printing process to form one or more interconnect structures; and drying the one or more (Continued)

Figure 1:
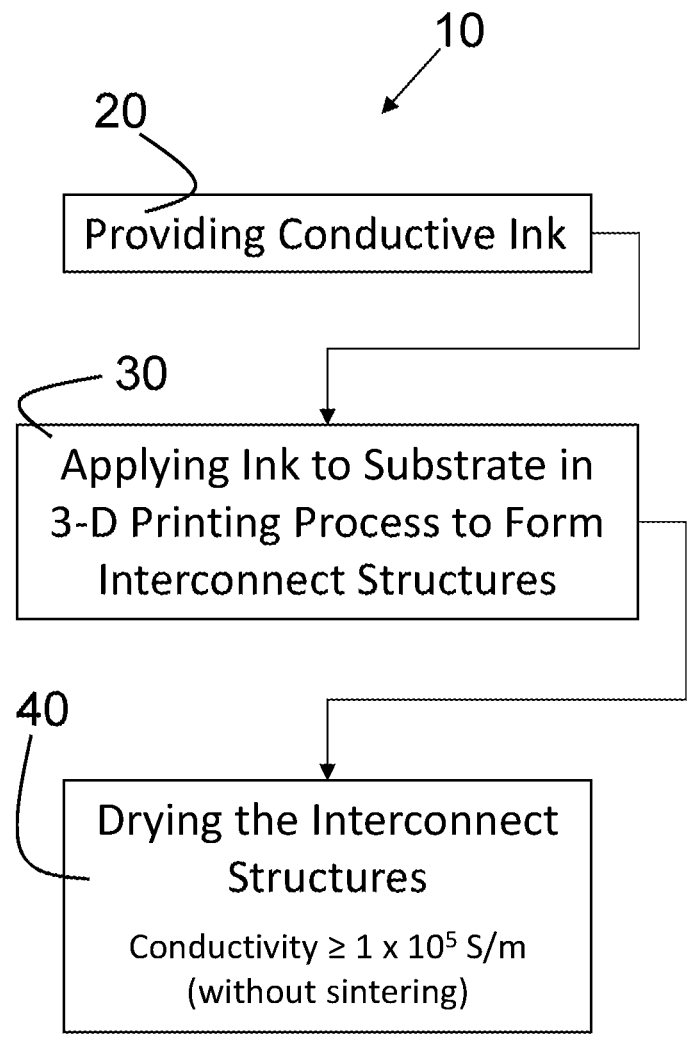

interconnect structures formed from the conductive ink composition. The dried interconnect structures exhibit a conductivity equal to or greater than $1 \times 10^5$ S/m without having to be subjected to any post-processing sintering treatment.

17 Claims, 2 Drawing Sheets

(51) Int. Cl.

| | | |
|---|---|---|
| *C09D 11/108* | (2014.01) | |
| *C09D 11/033* | (2014.01) | |
| *B33Y 10/00* | (2015.01) | |
| *B29C 64/106* | (2017.01) | |
| *B33Y 70/00* | (2020.01) | |
| *H01B 1/20* | (2006.01) | |
| *B29K 505/00* | (2006.01) | |
| *B33Y 80/00* | (2015.01) | |
| *B29K 96/04* | (2006.01) | |
| *B29K 105/00* | (2006.01) | |

(52) U.S. Cl.
CPC .......... *C09D 11/033* (2013.01); *C09D 11/037* (2013.01); *C09D 11/108* (2013.01); *H01B 1/20* (2013.01); *B29K 2096/04* (2013.01); *B29K 2105/0085* (2013.01); *B29K 2505/00* (2013.01); *B29K 2995/0005* (2013.01); *B33Y 80/00* (2014.12)

(56) References Cited

U.S. PATENT DOCUMENTS

| | | | | |
|---|---|---|---|---|
| 2013/0170171 | A1* | 7/2013 | Wicker | H01L 21/4846 |
| | | | | 361/809 |
| 2014/0353862 | A1 | 12/2014 | Erdman | |
| 2015/0001762 | A1 | 1/2015 | Lacaze et al. | |
| 2015/0165675 | A1 | 6/2015 | Dawson et al. | |
| 2016/0120040 | A1* | 4/2016 | Elmieh | G05B 19/4099 |
| | | | | 427/97.3 |
| 2016/0122570 | A1 | 5/2016 | Chae et al. | |
| 2016/0198576 | A1* | 7/2016 | Lewis | H01L 24/75 |
| | | | | 361/761 |
| 2016/0263823 | A1 | 9/2016 | Espiau et al. | |
| 2016/0319122 | A1 | 11/2016 | Niessner et al. | |
| 2016/0346997 | A1* | 12/2016 | Lewis | B33Y 80/00 |
| 2018/0230287 | A1* | 8/2018 | Shiozawa | C08L 33/06 |
| 2018/0236724 | A1 | 8/2018 | Compton et al. | |
| 2018/0298220 | A1* | 10/2018 | Kramer | H01B 1/04 |
| 2018/0320008 | A1 | 11/2018 | Fedynyshyn et al. | |
| 2021/0115283 | A1* | 4/2021 | Wang | C09D 11/106 |

FOREIGN PATENT DOCUMENTS

| | | |
|---|---|---|
| CN | 103980594 A | 8/2014 |
| CN | 103980672 A | 8/2014 |
| CN | 103980675 A | 8/2014 |
| CN | 104031304 A | 9/2014 |
| EP | 3412715 A1 | 12/2018 |
| JP | 3838730 B2 | 10/2006 |
| WO | 2014194155 A1 | 12/2014 |
| WO | 2014204450 A1 | 12/2014 |
| WO | 2015091814 A1 | 6/2015 |
| WO | 2016145309 A1 | 9/2016 |
| WO | WO-2017026420 A1 * | 2/2017 .............. C08L 33/06 |
| WO | 2017079130 A1 | 5/2017 |
| WO | 2019195117 A1 | 10/2019 |

OTHER PUBLICATIONS

N,N-Dimethylformamide, 2015, PubChem, https://pubchem.ncbi.nlm.nih.gov/compound/N_N-Dimethylformamide (Year: 2015).*
3D Printing Resolution, May 1, 2019, 3 space, https://3space.com/blog/what-does-resolution-mean-in-3d-printing/ (Year: 2019).*
Park et al, "3D-printable, highly conductive hybrid composites employing chemically-reinforced, complex dimensional fillers and thermoplastic tri block copolymers", Jan. 23, 2017, Nanoscale, 9, 5072-5084 (Year: 2017).*
Jo et al., "3D polymer objects with electronic components interconnected via conformally printed electrodes", Sep. 18, 2017, Nanoscale, 9, 14798-14803 (Year: 2017).*
"1,3-Dichlorobenzene", 2014, PubChem, https://pubchem.ncbi.nlm.nih.gov/compound/1_3-Dichlorobenzene#section=Vapor-Pressure&fullscreen=true (Year: 2014).*
U.S. Appl. No. 15/773,282, filed May 3, 2018, Fedynyshyn, et al.
U.S. Appl. No. 16/864,522, filed May 1, 2020, Fedynyshyn, et al.
International Search Report dated Jul. 4, 2019 from corresponding PCT/US2019/024941, pp. 5.
International Written Opinion dated Jul. 4, 2019 from corresponding PCT/US2019/024941, pp. 8.
United States Patent and Trademark Office, Alexandria, Virginia, International Search Report of International Application No. PCT/US2016/059858 dated Feb. 21, 2017, 4 pages.
"Polymer Dielectrics for 3D-Printed RF Devices in the Ka Band," by Michael Lis et al., Advanced Materials Technologies, vol. 1, Issue 2 (May 6, 2016) pp. 1-6.
"Developing Flexible 3D Printed Antenna Using Conductive ABS Materials," by Milad Mirzaee et al., IEEE, Oct. 26, 2015, pp. 1308-1309.
"Polymer Dielectrics for 3D-Printed RF Devices in the Ka Band," by Michael Lis et al., Advanced Materials Technologies, DOI: 10.1002/admt.201600027, WILEY-VCH Verlag GmbH & Co. KGaA, 69469 Weinheim, Germany, 2016, 5 pages.
"A New Flexible and Multi-Purpose System Design for 3-Dimensional Printing," by Ho-Lung Li et al., Proceedings of the ASME 2011 International Manufacturing Science and Engineering Conference, MSEC2011, Jun. 13-17, 2011, Corvallis, Oregon, USA, 7 pages.
"The Properties of an UV Curable Support Material Pre-Polymer for Three Dimensional Printing," by Huang Bing et al., Journal of Wuhan University of Technology-Mater, Sci. Ed., Apr. 2010, vol. 25, No. 2, DOI: 10.1007/S11595-010-2278-6, pp. 278-281.
"Shape-Memory Polymers," by Marc Behl et al., Center for Biomaterial Development, Institute of Polymer Research, Materials Today, Apr. 2007, vol. 10, No. 4, pp. 20-28.
International Preliminary Report on Patentability, PCT/US2019/024941, dated Oct. 6, 2020, 6 Pages.
International Search Report and Written Opinion, PCT/US2020/031026, dated Jul. 17, 2020, 12 pages.

* cited by examiner

3-D PRINTED DEVICES FORMED WITH CONDUCTIVE INKS AND METHOD OF MAKING

REFERENCE TO RELATED APPLICATIONS

This application claims the benefit of U.S. Provisional Patent Application No. 62/651,830 filed Apr. 3, 2018, the disclosures of which are incorporated herein in the entirety.

FEDERALLY SPONSORED RESEARCH OR DEVELOPMENT

This invention was made with government support under contract number FA8702-15-D-0001 awarded by the U.S. Air Force. The government has certain rights in the invention.

FIELD

This disclosure relates generally to 3-dimensional (3-D) printed devices that contain at least one conductive feature. This disclosure further relates to conductive inks used in a 3-D printing process and a method of forming 3-D printed devices therefrom.

BACKGROUND

The statements in this section merely provide background information related to the present disclosure and may not constitute prior art.

Three-dimensional (3-D) printing is a process of making solid objects of virtually any shape from a digital model. In fact, 3-D printing is generally uses additive processes, i.e., where an object is created by laying down successive layers of a material. In addition, 3-D printing is able to print more than one material at the same time. Thus, 3-D printing processes are able to build very complex many-layered structures direct from the design. Three-dimensional printing processes are routinely used for both rapid prototyping and manufacturing on demand. Several types of 3-D printing processes that may be used with conductive materials include ink jet printing, extrusion printing, laser/e-beam sintering, and laser/e-beam melting. Laser sintering and/or electron beam (e-beam) sintering are additive manufacturing techniques that use a laser or e-beam as a power source to sinter powdered metals into a 3-D printed shape by partial melting of the metal during contact with the laser or electron beam. The laser or e-beam may be directed to different locations in the powdered metal bed and when focused into a spot the exposed powder is sintered. Laser melting and/or electron beam melting are conceptually similar but instead of sintering the metal powder, the laser or e-beam imparts sufficient power into the powder to melt the metal and fuse it into a continuous mass thereby forming the metal powder into a solid 3-dimensional part. Both techniques can provide a metal structure or feature that is conductive although at the increased expense associated with running a high temperature process that may also melt, damage, or decompose polymers that are in close proximity.

Ink jet printing processes form a 3-D structure by jetting a liquid binder onto a powder bed or a photopolymer through multiple jet heads followed by photocuring in order to fix or crosslink the deposited polymer. Ink jet printing of conductive inks does not normally result in a highly conductive structure because the polymer carrier intermixed with the metal particles acts as an insulator between the metal particles. In order to use ink jet printing to form conductive features or structures, the process needs to be coupled with a sintering step. This sintering step generally involves exposing the deposited ink to high temperature heating (e.g., greater than 200° C.), light sintering, chemical sintering, or another sintering technique. This additional processing step adds to the manufacturing cost and increases process complexity. Thus, the use of an ink jet printing process is generally limited to the formation of simple features or structures that are capable of withstanding high temperatures.

Extrusion printing processes can be either thermal-based or solvent-based. A thermal-based extrusion 3-D printing process utilizes the extrusion of a thermoplastic material. This process works by melting a plastic filament that is deposited via a heated extruder, a layer at a time, onto a build platform according to 3-D spatial data supplied to the printer. Each layer hardens as it is deposited and bonds to the previous layer. Thus, an extrusion printing process is primarily a polymer-based printing technique and is not applicable to the printing of conductive materials.

SUMMARY

The present disclosure generally provides a 3-D printed device that contains one or more conductive features or structures, as well as a method of forming such devices. The 3-D printed devices may be formed using a method that comprises providing a conductive ink composition; applying the conductive ink composition to a substrate in a 3-D solvent cast printing process to form one or more interconnect structures; and drying the one or more interconnect structures formed from the conductive ink composition. The dried interconnect structures exhibit a conductivity equal to or greater than $1 \times 10^5$ S/m without having to be subjected to any post-processing sintering treatment. Alternatively, the conductivity exhibited by the dried interconnect structures exhibit a conductivity that is equal to or greater than $1 \times 10^6$ S/m.

The conductive ink composition generally comprises, consists of, or consists essentially of a plurality of conductive particles dispersed in a solvent along with one or more solubilized diblock or triblock copolymers. These diblock or triblock copolymers have an A-B, A-B-A, or A-B-C block-type structure in which the A-blocks and C-blocks are an aromatic-based polymer or an acrylate-based polymer and the B-blocks are an aliphatic-based polymer.

Although the use of diblock and/or triblock copolymers in 3-D printing processes has been known for deposition of nonconductive (e.g., dielectric-filled) structures, it was generally assumed that such polymeric carriers could not be mixed with sufficient amounts of conductive fillers to yield conductive features. Surprisingly, the polymeric carriers of the present invention are able to support large quantities (e.g., up to 90 percent by weight) of conductive filler materials while still maintaining sufficient fluidity to permit 3-D printing of conductive features. Also surprisingly, the conductive inks of the present invention can be used without the need for any sintering or other thermal post-printing step to remove or reduce the amount of polymer in the formed features.

It has further been surprisingly discovered that the solvent component of the conductive ink can play an important role in achieving highly conductive printed features. In certain embodiments, hydrocarbon solvents, e.g., solvent compositions composed essentially of only hydrogen and carbon, can yield highly conductive features. Preferred solvents can include aromatic hydrocarbon solvents and, in particular, bicyclic aromatic hydrocarbon solvents, such as tetralin. Without being bound by any theory, preferred solvents are believed to be solvents that have a higher boiling point (or slower evaporation rate) such that the surface of the printed conductive feature can relax in a more orderly fashion and the resulting lower surface roughness contributes to lower resistivity (higher conductivity). In certain embodiments, preferred solvents can include solvents than have vapor pressures (mmHg at 20 C) less than 5 or less than 2, or less than 1, or less than 0.5. Alternatively, the solvent can have an evaporation rate (NBAC=1.0) of less than 0.5 or less than 0.1.

In one aspect of the invention, methods of forming a 3-D printed devices are disclosed utilizing a conductive ink composition comprising a plurality of conductive particles dispersed in a solvent along with one or more solubilized diblock or triblock copolymers; the diblock or triblock copolymers having an A-B, A-B-A, or A-B-C block-type structure in which the A-blocks and C-blocks are an aromatic-based polymer or an acrylate-based polymer and the B-blocks are an aliphatic-based polymer. In these methods, the conductive ink composition is applied to a substrate in a 3-D solvent cast printing process to form one or more interconnect structures; and then dried to form the one or more interconnect structures formed from the conductive ink composition, wherein the dried interconnect structures exhibit a conductivity equal to or greater than $1 \times 10^5$ S/m without being subjected to a post-processing sintering treatment. Such interconnect structures can exhibit an RMS surface finish of less than or equal to 10 micrometers and the conductive particles comprise at least 80 wt. % of the dried interconnect structures based on the dry weight of the applied conductive ink composition. The drying step can be conducted at a temperature that is less than 200° C., or in some instances, less than 100° C. The methods disclosed herein can be conducted in melt-based or solvent-based extrusion 3-D printing processes. Preferably, the conductivity exhibited by the dried interconnect structures exceeds $1 \times 10^6$ S/m and/or the interconnect structures are formed with a printing resolution of less than 1,600 micrometers.

In another aspect of the invention, conductive ink compositions are disclosed comprising a plurality of conductive particles dispersed in a solvent along with one or more solubilized diblock or triblock copolymers; the diblock or triblock copolymers having an A-B, A-B-A, or A-B-C block-type structure in which the A-blocks and C-blocks are an aromatic-based polymer or an acrylate-based polymer and the B-blocks are an aliphatic-based polymer. In some instances, the one or more A-blocks or C-blocks in the diblock or triblock copolymers can comprise polystyrene or a derivative thereof and the B-block can comprise polyethylene, polypropylene, polybutadiene, polyisoprene, poly(ethylene-ran-butylene), or a derivative thereof. The diblock or triblock copolymers can have a molecular weight that is in the range of about 10,000 to 10,000,000 Daltons and a ratio of A-blocks and C-blocks to B-blocks that is in the range of 1:1 to 1:10. The conductive ink composition can further include at least one homopolymer, copolymer, terpolymer, or higher polymer in addition to the one or more diblock or triblock copolymers.

In certain embodiments, the conductive ink compositions comprise 60 wt. % or more of the conductive particles, 20 wt. % or less of the one or more the diblock or triblock copolymers, and less than 25 wt. % of the solvent-based upon the overall weight of the ink composition. In other embodiments, the conductive ink composition comprises 75 wt. % or more of the conductive particles, 15 wt. % or less of the one or more the diblock or triblock copolymers, and less than 15 wt. % of the solvent-based upon the overall weight of the ink composition. Preferably, the weight percentage of conductive particles in the conductive ink compositions ranges from about 60% to about 90%, or from 65% to 85%, or from 70% to 80%.

The conductive particles can include metal particles, graphene particles, graphite particles, or mixtures thereof that have a particle size in an x-dimension or y-dimension or z-direction that is in the range of about 0.1 micrometer to about 15 micrometers. In some embodiments, the conductive particles can also have a flattened or disc-like shape, e.g., have an aspect ratio defined by lengths in the x-, y-, and z-dimensions, such that the conductive particles have a z-dimension that is no more than 20% of the lesser of the x-dimension or the y-dimension. In certain embodiments, the metal particles in the conductive ink composition can include one or more of the following: silver, copper, gold, aluminum, calcium, beryllium, rhodium, magnesium, molybdenum, iridium, tungsten, zinc, cobalt, cadmium, nickel, ruthenium, lithium, iron, platinum, palladium, tin, selenium, tantalum, niobium, chromium, lead, vanadium, uranium, antimony, zirconium, titanium, germanium, silicon, or alloys and mixtures thereof. The conductive particles can also have a surface that is modified with a hydrophobic moiety, polyvinylpyrrolidone, an amine-containing compound, or a silane coupling agent.

As noted above, the solvent can be a hydrocarbon solvent, an aromatic hydrocarbon solvents and, in particular, bicyclic aromatic hydrocarbon solvents, such as tetralin. The solvents can also include substituted aromatic solvents, cellosolve-based solvents, glycol-based solvents, ester-based solvents, ketone-based solvents, alcohol-based solvents, ether-based solvents, or highly polar solvents, or mixtures or combinations thereof. In certain embodiments, the solvent can have a boiling point that is in the range of about 110° C. to 220° C. The solvent can also include a curable vinyl-containing monomer or mixture of vinyl-containing monomers.

The conductive ink composition can further include a thermal or photo-induced free radical generator, and the process further comprises subjecting the interconnect to sufficient heat or actinic radiation to generate the free radicals. The conductive ink composition can also include at least one of a sensitizer, a dye, a surfactant, a stabilizer, a colorant, an ultraviolet absorber, an antioxidant, or a defoaming agent.

In another aspect of the invention, 3-D printed devices are disclosed having one or more interconnect structures, the interconnect structures including a plurality of conductive particles and one or more diblock or triblock copolymers; the diblock or triblock copolymers having an A-B, A-B-A, or A-B-C block-type structure in which the A-blocks and C-blocks are an aromatic-based polymer or an acrylate-based polymer and the B-blocks are an aliphatic-based polymer. The conductive particles can comprise at least 80 wt. % of the interconnect structures based on the overall weight of the interconnect structures. In some embodiments, the interconnect structures exhibit a conductivity equal to or greater than $1 \times 10^5$ S/m or exceed $1 \times 10^6$ S/m without being subjected to a post-processing sintering treatment and/or the interconnect structures exhibit a printing resolution of less than 1,600 micrometers (µm). In some embodiments, the interconnect structures can also exhibit an RMS surface finish of less than or equal to 10 micrometers.

The 3-D printed devices according to the invention can include low size weight and power (SWaP) devices, RF devices, microfluidic devices, biocompatible medical devices, or digital phased arrays that includes a mixture of digital and RF functions.

Further areas of applicability will become apparent from the description provided herein. It should be understood that the description and specific examples are intended for purposes of illustration only and are not intended to limit the scope of the present disclosure.

DRAWINGS

Figure 2:
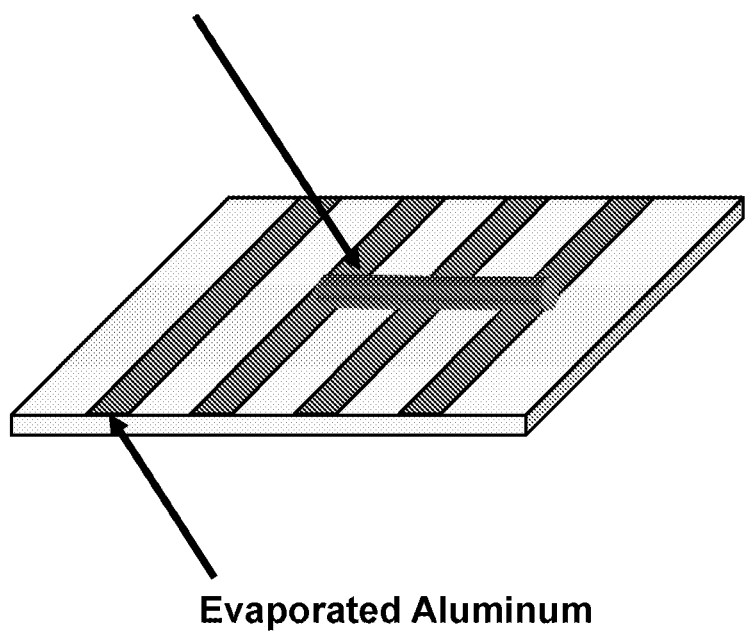

In order that the disclosure may be well understood, there will now be described various forms thereof, given by way of example, reference being made to the accompanying drawings, in which:

FIG. 1 is a flowchart of a method for forming a 3-D printed device according to the teachings of the present disclosure; and FIG. 2 is a schematic representation of a printed wire filament formed on a glass slide with aluminum strips used for four-wire resistance measurements.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, the 3-dimensional (3-D) printed devices made and used according to the teachings contained herein are described throughout the present disclosure in conjunction with radio frequency (RF) devices in order to more fully illustrate the composition and the use thereof. The incorporation and use of such interconnect structures formed according to the teachings of the present disclosure in other devices, including, but not limited to, low size weight and power (SWaP) devices, microfluidic devices, biocompatible medical devices, or digital phased arrays that include a mixture of digital and RF functions, or the like are contemplated to be within the scope of the present disclosure. It should be understood that throughout the description, corresponding reference numerals indicate like or corresponding parts and features.

The present disclosure uses a 3-D printing process to deposit a conductive ink in order to form advanced devices that offer significant advantages in properties or performance over commercially available materials or allow for the fabrication of devices not possible by conventional fabrication methods. The 3-D printed devices comprise one or more interconnect structures that exhibit a conductivity equal to or greater than $1 \times 10^5$ S/m; alternatively, equal to or greater than $1 \times 10^6$ S/m.

The ability to print these conductive inks using a high resolution 3-D printing process enables one to form any number of advanced devices, including without limitation fully integrated MHz to THz RF devices, flexible electronics, and microfluidics. The use of a high resolution, 3-D printing process offers significant intrinsic advantages for enhancing device performance and reducing SWaP. These advantages are based on the fact that devices can be fabricated by 3-D printing according to the present disclosure with a resolution capability that subtractive manufacturing could never achieve. A major limiting factor for the 3-D printing of high frequency devices is the availability of printable materials for conductors that exhibit good RF properties and that do not require high temperature post-processing, which can damage or decompose organic dielectrics.

According to one aspect of the present disclosure, the 3-D printing of the conductive inks provides for the formation of high resolution structures, e.g., components or structures are printed in close proximity to each other, with some structures exhibiting conductivity and other structures exhibiting dielectric properties. This ability may be important for many applications that are focused on the miniaturization of devices. One such example is a device where many different types of functionality are placed in a small volume or area such as phase array antennas that operate at high frequency in low size weight and power (SWaP) devices.

One clear advantage of the present disclosure is the ability to 3-D print conductive materials without the need for sintering or other post-processing treatments that involve thermal sintering, chemical sintering, photolytic sintering, or another type of sintering treatment. Thus, the use of the 3-D printable conductive inks allows for easy manufacturing, reproduction, and use of these devices by making it straight forward to go from design to a physical part using a 3-D printing process. In other words, the use of a simplified manufacturing process for multilevel and complex devices will accelerate the design-to-test cycle and enhance the pace of innovation with extensions into full manufacturing.

For the purpose of this disclosure the terms "about" and "substantially" are used herein with respect to measurable values and ranges due to expected variations known to those skilled in the art (e.g., limitations and variability in measurements).

As used herein, the term "polymer" refers to a molecule having polymerized units of one or more species of monomer. The term "polymer" is understood to include both homopolymers and copolymers. The term "copolymer" refers to a polymer having polymerized units of two or more species of monomers, and is understood to include terpolymers. As used herein, reference to "a" polymer or other chemical compound refers one or more molecules of the polymer or chemical compound, rather than being limited to a single molecule of the polymer or chemical compound. Furthermore, the one or more molecules may or may not be identical, so long as they fall under the category of the chemical compound. Thus, for example, "a" polyurethane may be interpreted to include one or more polymer molecules of the polyurethane, where the polymer molecules may or may not be identical (e.g., different molecular weights).

The term "hydrocarbon solvent" as used herein refers to solvent compositions composed essentially of only hydrogen and carbon and having less than 1 percent, or less than 0.5 percent, or less than 0.1 percent by weight of any other element.

The term "evaporation rate" or "vaporization rate" is a measurement of speed of evaporation of a chemical, e.g., a solvent in the ink compositions of the present invention, compared to a standard such as normal butyl acetate (NBAC or NBUAC) whose vaporization rate is standardized as 1.0.

For the purpose of this disclosure, the term "weight" refers to a mass value, such as having the units of grams, kilograms, and the like. Further, the recitations of numerical ranges by endpoints include the endpoints and all numbers within that numerical range. For example, a concentration ranging from 40% by weight to 60% by weight includes concentrations of 40% by weight, 60% by weight, and all concentrations there between (e.g., 40.1%, 41%, 45%, 50%, 52.5%, 55%, 59%, etc.).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one polyurethane", "one or more polyurethanes", and "polyurethane(s)" may be used interchangeably and are intended to have the same meaning.

Referring to FIG. 1, a method 10 of forming a 3-D printed device is provided. This method 10 of the present disclosure, generally comprises providing 20 a conductive ink composition that comprises, consists of, or consists essentially of a plurality of conductive particles dispersed in a solvent along with one or more solubilized diblock or triblock copolymers; the diblock or triblock copolymers having an A-B, A-B-A, or A-B-C block-type structure in which the A-blocks and C-blocks are an aromatic-based polymer or an acrylate-based polymer and the B-blocks are an aliphatic-based polymer. This conductive ink is applied 30 to a substrate in a 3-D solvent cast printing process to form one or more interconnect structures. The one or more interconnect structures formed from the conductive ink composition are then dried 40. The drying of the interconnect structures is done at a temperature that is less than 200° C.; alternatively, less than 100° C.

The conductive particles comprise at least 80 wt. % of the dried interconnect structures based on the overall weight of the interconnect structures. The dried interconnect structures exhibit a conductivity equal to or greater than $1\times10^5$ S/m without being subjected to a post-processing sintering treatment. Alternatively, the dried interconnect structures exhibit a conductivity equal to or greater than $1\times10^6$ S/m without being subjected to a post-processing sintering treatment. Alternatively, the conductivity may be greater than $3\times10^6$ S/m. This level of conductivity represents about a 30-fold increase in conductivity over commercially available inks and exceeds 5% of the conductivity of bulk silver.

The dried interconnect structures also exhibit an RMS surface finish that is less than or equal to 10 micrometers (μm); alternatively, less than or equal to 5 μm; alternatively, less than or equal to 1 micrometer; alternatively, in the range of about 400 nanometers to 1 micrometer. Although not wanting to be held strictly to theory, it is believed that the conductivity of the dried interconnect structures are inversely proportional to the surface roughness. More specifically, the conductivity of the dried interconnect structures increases as the RMS surface finish decreases.

The dried interconnect structures formed as part of the 3-D printed device may be accomplished with a printing resolution that is between about 1 micrometer (μm) and about 2,000 micrometers; alternatively, between about 50 μm and 1,600 μm. When desirable or required for use in a predetermined application the printing resolution may be less than about 1,600 micrometers (μm); alternatively, 1,000 micrometers or less; alternatively less than 600 μm; alternatively, less than 250 μm; alternatively, less than 200 micrometers; alternatively, less than 50 micrometers.

A 3-D solvent cast printing process, which is the same or similar to a melt-based or solvent-based extrusion 3-D printing process, generally, includes preparing a high solids polymer-based printing ink in a solvent followed by extrusion of the material onto a substrate under mechanical force or air pressure. In this process, the printing ink has been shown to be highly shear thinning, a trait that provides low viscosity at the high shear rates typical of passing through a narrow nozzle under pressure and high viscosity at low shear rates as occurs when deposited. This shear thinning behavior allows the deposited polymer to hold its shape. Conductive inks that exhibit high shear thinning typically have a near two orders of magnitude drop in viscosity going from high to low shear forces.

This deposited shape can be further stabilized through the rapid evaporation of the solvent or by rapid photopolymerization. After deposition, rapid evaporation of the solvent occurs further solidifying the printed object although solvent evaporation can occurs at any time during and after deposition. As the solvent evaporates from the ink post extrusion, the rigidity gradually increases with time due to a locally higher polymer concentration caused by the solvent evaporation and with continued solvent evaporation finally forms a solid.

The conductive ink composition of the present disclosure is composed of at a minimum three main components, namely, a plurality of conductive particles, one or more block copolymers, and a solvent. One advantage of incorporating a sufficient concentration of conductive particles in the ink composition is that the ink composition exhibits conductivity when printed on a substrate and dried without the need for sintering or any other post-processing treatment. The amount of conductive particles in the ink composition may be greater than 40 wt. % of the total weight of the ink including the copolymer and solvent. Alternatively, the amount of conductive particles may be greater then 60 wt. % of the total weight of the ink; alternatively, the amount of conductive particles may be greater than 75 wt. % of the total weight of the ink.

The amount of block copolymers incorporated into the ink composition should impart sheer thinning behavior to the ink without reducing the conductivity of the ink. The amount of block copolymers may be less than 20 wt. % of the total weight of the ink including the conductive particles and solvent. Alternatively, the amount of block copolymers may be less than 15 wt. % of the total weight of the ink. Alternatively, the amount of block copolymers may be less than 10 wt. % of the total weight of the ink.

The amount of solvent present in the ink composition also imparts sheer thinning behavior to the ink but not so much as to reduce the viscosity of the ink to levels at which sheer thinning behavior is diminished or Newtonian behavior is encountered. The amount of solvent may be less than 25 wt. % of the total weight of the ink including the metal and block copolymers. Alternatively, the amount of solvent may be less than 15 wt. % of the total weight of the ink. Alternatively, the amount of solvent may be less than 10 wt. % of the total weight of the ink.

Block Copolymers—

The block copolymers can be employed as the only polymer in the conductive ink composition or when desirable used with other polymers to form high resolution structures in a 3-D printing process. These block copolymers can be either diblock or triblock copolymers; alternatively, the block copolymers are triblock copolymers. When diblock copolymers are used they may have an A-B block-type structure where A-blocks designates one type of polymer and B-blocks designate a second type of polymer. When triblock copolymers are used they may have an A-B-A block-type or an A-B-C block-type structure, where A-blocks, B-blocks, and C-blocks designate different polymers.

The block copolymers must have end-blocks (e.g., A-blocks and C-blocks) and mid-blocks (e.g., B-blocks) that are incompatible polymers, such that if a simple mixture of the two polymers would undergo phase separation. However, in the block copolymers these incompatible phases are chemically bonded together and cannot separate but instead arrange themselves into domains on a microscopic level. Although not wanting to be strictly held to theory, the end-blocks of the copolymers may become attracted to end-blocks in adjacent copolymers, thereby, leading to the formation of a highly viscous solution. However, this viscous polymer solution will undergo shear thinning when the shear force disrupts the attractive forces, thereby, lowering the solution viscosity and enhancing the ability to copolymers to flow.

Any two incompatible polymers can be used in formation of the block copolymers. When desirable, end-blocks (e.g., A-blocks and C-blocks) may comprise an aromatic-based or acrylate-based polymer and the mid-blocks (e.g., B-blocks) may comprise an aliphatic-based polymer. According to one aspect of the present disclosure, the use of styrene or any substituted styrene is acceptable for the aromatic portion of the block copolymers. Any acrylate-based or methacrylate-based polymer is also acceptable for use as one of the A-blocks or C-blocks of the block copolymers. Any aliphatic-based polymer or substituted aliphatic-based polymer is acceptable for use as the B-blocks in the block copolymers. Alternatively, the A-blocks and C-blocks in the diblock and/or triblock copolymers may be selected from either polystyrene or a derivative of polystyrene and a B-blocks are selected from either polyethylene, polypropylene, or a variant of a linear hydrocarbon polymer, such as polybutadiene, polyisoprene, or poly(ethylene-ran-butylene), or a derivative of any of these polymers. The copolymers having the A-, B-, and C-blocks as defined herein exhibit sheer thinning behavior and as such are materials that may be deposited using either a melt-based or solvent-based extrusion 3-D printing process.

Any molecular weight of the block copolymers can be used in the conductive ink composition of the present disclosure. Alternatively, the molecular weight of the diblock and/or triblock copolymers used in the conductive ink is between about 10,000 and 10,000,000 Daltons; alternatively, between about 25,000 and 1,000,000 Daltons.

Similarly, any ratio of end-block polymers (e.g., A-blocks and C-blocks) to mid-block polymers (e.g., B-blocks) is acceptable for use in the conductive ink composition of the present disclosure. Alternatively, the ratio of A-blocks and C-blocks to B-blocks in the diblock or triblock copolymers is in the range of about 1:1 and 1:10; alternatively, in the range of about 3:20 and 3:10.

The viscosity of the conductive ink composition is a function of the molecular weight of the block copolymers and the amount of copolymer that is dissolved in the solvent. Any combination of copolymer molecular weight and the amount of copolymer dissolved in the solvent is acceptable for use in the conductive ink of the present disclosure. However, when desirable amount of polymer dissolved in the solvent may be greater than 10 wt. %; alternatively greater than 25 wt. % based on the overall weight of the conductive ink composition.

When desirable, a second or additional polymer may be added to the conductive ink composition. This second or additional polymer may be a homopolymer, copolymer, terpolymer or higher polymer. The second polymer need not be a block copolymer to be used with the block copolymer in the conductive ink. Rather, a homopolymer or random copolymer can added to improve one or more properties exhibited by the 3-D printed structure or feature. This second or additional polymer should be compatible with the block copolymer present in the conductive ink composition. The addition of this second polymer to the conductive ink composition allows for the modification of the properties exhibited by the printing ink and the final printed structure through the use of mixtures of polymers and block copolymers.

Several non-limiting examples of the second polymers that can be added to the conductive ink composition and used in conjunction with the block copolymers are polyethylenes, polypropylenes, polytetrafluoroethylenes, polystyrenes, poly indenes, polyvinyl acetates, polyvinylalcohols, polyacrylates, polymethacrylates, polyacryonitrile, polyvinyl chloride, polyvinylidine chloride, polyamides, polyesters, epoxy resins, polyformaldehyde resins, amino-formaldehyde resins, phenol-formaldehyde resins, cellulose and cellulose derivatives, proteins, natural rubber, polyisoprene, polybutadiene, polynitrile rubbers, chloroprene rubbers, polyurethanes, and polysilicones.

Conductive Particles—

The conductive particles may comprise, without limitation particles of carbon, graphene, or carbon nanotubes, metal particles, or combinations thereof. The conductive particles are incorporated into the conductive ink formulation in an amount that does not interfere with the 3-D printing process. The conductive particle's geometry may be a flake, sphere, cube, rod, wire, or any irregular shape.

Several examples of metal particles that can be used in the conductive ink composition include, but are not limited to silver, copper, gold, aluminum, calcium, beryllium, rhodium, magnesium, molybdenum, iridium, tungsten, zinc, cobalt, cadmium, nickel, ruthenium, lithium, iron, platinum, palladium, tin, selenium, tantalum, niobium, chromium, lead, vanadium, uranium, antimony, zirconium, titanium, germanium, and silicon. The metal particles may also include any alloys formed from the metals listed above. Several examples of such alloys include, without limitation, brass, steel, bronze, indium tin oxide, silver solder, and tin solder.

The conductive particles may be of any shape including spherical, flat, polyhedron, or irregular. Alternatively, the conductive particles may be characterized as having an aspect ratio defined by lengths in the x-, y-, and z-dimensions, such that the conductive particles have a z-dimension that is no more than 20% of the lesser of the x-dimension or the y-dimension; alternatively, less than 10% of the x-dimension or the y-dimension. When desirable, the conductive particles may be described as being flat. The conductive particles may also be characterized as having a particle size in the x-dimension and/or y-dimension that is in the range of about 0.1 micrometer (µm) to about 15 micrometers; alternatively, in the range of about 2 micrometers to about 8 micrometers; alternatively, in the range of about 2 micrometers to about 4 micrometers; alternatively, in the range of about 0.1 µm to about 2 µm.

The conductive particles may be added directly to the block copolymers and solvent in the ink composition or alternatively, the surface of the particles may be modified to increase compatibility with the block copolymers and solvent. One method of increasing such compatibility is to enhance the hydrophobicity of the particle's surface. In this respect, one may attach a hydrophobic moiety to the surface of the particle through either covalent bonding, ionic attraction, or any other known surface absorption technique. Several examples, of polymers and compounds that may be used to modify the surface of the particles, include but are not limited to polyvinylpyrrolidone; amine-containing compounds, such as decylamine; silane coupling agents, such as chlorosilanes and/or alkoxysilanes; surfactants, such as steric acid or lauryl acid; and thiol-containing organic compounds. Those skilled in the art will recognize that other methods of modifying the particle's surface in order to increase solvent and ink compatibility may be used without exceeding the scope of the present disclosure.

Solvents—

Any type of solvent may be used in the conductive ink of the present disclosure as long as the solvent is capable of solubilizing the block copolymers, as well as any optionally added or secondary polymers. The solvent in the conductive ink composition may comprise an aromatic solvent, a cellosolve-based solvent, a glycol-based solvent, an ester-based solvent, a ketone-based solvent, an alcohol-based solvent, an ether-based solvent, a highly polar solvent, or a mixture or combination thereof. Alternatively, the solvent has a boiling point that is in the range of about 110° C. to 220° C.

Several examples of aromatic solvents include but are not limited to benzene, toluene, xylene, ethylbenzene, tetralin, cumene (isopropylbenzene), cymene (isopropyltoluene), chlorobenzene, dichlorobenzene, mesitylene, or any other substituted aromatic solvent. Several examples of cellosolve-based solvent include, without limitation methyl cellosolve, ethyl cellosolve, methyl cellosolve acetate or ethyl cellosolve acetate. Several examples of glycol-based solvents, include but are not limited to ethylene glycol monomethyl ether, diethylene glycol monomethyl ether, diethylene glycol dibutyl ether, diethylene glycol, diethylene glycol dimethyl, propylene glycol monoethyl ether, propylene glycol monobutyl ether, propylene glycol monomethyl ether acetate, dipropylene glycol dimethyl ether, or propylene glycol monoethyl ether acetate.

Several non-limiting examples of ester-based solvents include butyl acetate, amyl acetate, ethyl butyrate, butyl butyrate, diethyl oxalate, ethyl pyruvate, ethyl-2-hydroxybutyrate, 2-methylacetoacetate, methyl lactate, or ethyl lactate. The alcohol-based solvents may include, without limitation, heptanol, hexanol, nonanol, diacetone alcohol, or furfuryl alcohol.

Several examples of suitable ketone-based solvents include but are not limited to cyclohexanone or methylamyl ketone. Several non-limiting examples of ether-based solvents that are useful as solvating agents include methyl phenyl ether and diethylene glycol dimethyl ether. The polar solvents that may be used in the ink composition include, but are not limited to dimethylformamide and N-methylpyrrolidone.

Each solvent can be used in the conductive ink composition either alone or as a combination of two or more solvents. The solvent is typically present in an amount that ranges from 1 to 100 times by weight relative to the total amount of the solid content of the ink composition.

The printed conductive ink may be sufficiently stable in terms of holding their form or shape as deposited. However, according to another aspect of the present disclosure, the printed copolymers may be subjected to or undergo a post-deposition stabilization process. One such post-deposition stabilization process would be to crosslink the copolymers after or during deposition. This type of stabilization process may include exposing the printed ink composition to actinic radiation having a wavelength that is between about 150 and about 500 nm; alternatively, in the wavelength range from about 190 nm to about 400 nm. The use of such ultraviolet (UV) radiation by may be sufficient to allow the copolymers to undergo crosslinking.

Solvent evaporation may lead to anisotropic shrinkage, particularly in the case of thicker (e.g., multilayer) printed structures or bodies. To ameliorate these effects, the aromatic solvents may be replaced with a curable vinyl-containing monomer or mixture of vinyl-containing monomers. The replacement of the aromatic solvents with the vinyl-containing monomers does not have a detrimental effect on the rheological properties exhibited by the ink composition. In some cases, the solvent may comprise a vinyl-containing monomer selected from among 4-benzhydrylstyrene, 4-tert-butylstyrene, 2,4-dimethylstyrene, 2,5-dimethylstyrene, 2,4-diphenyl-4-methyl-1-pentene, 2-methylstyrene, 3-methylstyrene, 4-methylstyrene, a-methylstyrene, 2,3,4,5,6-pentafluorostyrene, styrene, 2,4,6-trimethylstyrene, 9-vinylanthracene, 4-vinylbenzocyclobutene, 4-vinylbiphenyl, 2-vinylnaphthalene and 2-vinylnaphthalene, to name a few examples. The solvent may also include a crosslinking agent in addition to the vinyl-containing monomer in order to promote crosslinking after printing, with several examples including but not limited to o-divinylbenzene, m-divinylbenzene and/or p-divinylbenzene.

When the solvent comprises a vinyl-containing monomer, a secondary post stabilization process may be optionally used. This secondary post stabilization process includes incorporating either a thermal or photo-induced free radical generator into the conductive ink composition to crosslink the monomer in the presence of the diblock and/or triblock copolymers. The crosslinking may occur either during or after deposition. The thermal or photo-induced free radical generators may generate free radicals upon the application of heat or by exposing the printed ink to actinic radiation. Any number of known radical forming materials, such as photoinitiators, could find use in some implementations of this type of post stabilization process. Several examples of photoinitiators include, without limitation, those supplied by Ciba Specialty Chemicals (Basel, Switzerland) under the trademark Irgacure®, Darocur®.

Any number of known radical forming materials, such as thermal radical generators could find use in some implementations of this type of post stabilization process. Several examples of thermal radical generators include, but are not limited to, 4,4-Azobis(4-cyanovaleric acid), 1,1'-azobis-(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane, 2,5-bis-(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, and potassium persulfate.

When desirable, a sensitizer may also be added to the conductive ink formulation in order to increase the absorbance of the material and by energy transfer to the photoinitiator or photo-crosslinker increase the amount of radicals generated, thereby, increasing the sensitivity of the material towards photons. Any sensitizer may be chosen from those that are known in the art. Several specific examples of sensitizers include, without limitation, UVS-1101, UVS-1221, and UVS-1331 from Kawasaki Kasei Chemicals Ltd. (Japan).

When desirable, a dye also may be added to the conductive ink composition in order to increase the absorbance without sensitization of the material. Any dye that is added to the conductive ink may also produce a colored material that could be more aesthetically pleasing or offer other advantages. This dye may also absorb light in the non-visible part of the spectrum and be used to reduce the amount of light penetration into the material and thus limit the depth to which crosslinking of the copolymers occurs. The advantage of limiting the depth of crosslinking would be to obtain finer resolution in the depth or Z-direction of each discrete interconnect structure or voxel.

According to yet another aspect of the present disclosure, the ink may also comprise one or more additives. These additives may include but not be limited to surfactants (e.g., non-ionic), coating property-improving agents, stabilizers, colorants, ultraviolet absorbers, antioxidants, and defoaming agents. The amount of each additive may be any level that does not impair the desired properties of the conductive ink.

Alternatively, the additive may be added to the conductive ink composition in an amount that is less than about 2 parts by weight per 100 parts per weight of the ink composition. Alternatively, the additive is added in an amount that ranges from about 0.005 to about 1 part by weight per 100 parts by weight of the ink composition.

Several examples of nonionic surfactants that may be used include, without limitation, polyoxyethylene alkyl ethers, such as polyoxyethylene lauryl ether, polyoxyethylene stearyl ether, and polyoxyethylene oleyl ether; polyoxyethylene alkylphenyl ethers, such as polyoxyethylene octylphenyl ether and polyoxyethylene nonylphenyl ethers; and polyethylene glycol dialkyl esters, such as polyethylene glycol dilaurate and polyethylene glycol distearate.

Alternatively, the surfactants may also include fluorine-containing surfactants that contain one or more fluoroalkyl or perfluoroalkyl groups. Several examples of fluorine-containing surfactants include, but are not limited to Efftop® EF301, EF303 and EF352 (manufactured by Shinakitakasei Co., Ltd., Japan), Megafac® F171, F172 and F173 (manufactured by Dainippon Ink Co., Ltd., Tokyo, Japan), Asahi-guard® AG710 (manufactured by Asahi Glass Co., Ltd., Japan), Florade FC430 and FC431 (manufactured by Sumitomo 3M Co., Ltd., Japan), and Surflone® S-382, SC101, SC102, SC103, SC104, SC105 and SC106 (manufactured by Asahi Glass Co., Ltd., Japan).

The optional surfactant incorporated into the conductive ink composition may also be an organosiloxane surfactant, an acrylic acid-type polymer, or methyacrylic acid-type polymer. One specific example of an organosiloxane surfactant includes KP341 (manufactured by Shinetsu Kagaku Kogyo Co., Ltd., Japan). Organosiloxane surfactants may also decrease the surface tension exhibited by the conductive ink composition. Several examples of acrylic acid-type or methacrylic acid-type polymers and copolymers include, without limitation, Polyflow® No. 75, No. 95, and WS (manufactured by Kyoeisha Yushikagaku Kogyo Co., Ltd., Japan).

Although an advantage of the conductive ink of the present disclosure is that high conductivity is achieved in the interconnect structures formed upon printing and drying the ink composition without the need to expose the structures to any type of post processing sintering treatment, certain applications may require that the conductivity of the deposited and dried ink be further enhanced. A further enhancement in the conductivity of the deposited and dried ink may be obtained upon subjecting the printed interconnect structures to a post-processing sintering treatment known by those skilled in the art. Several non-limiting examples of such post-processing sintering treatments include thermal sintering, electrical sintering, chemical sintering, plasma sintering, photonic sintering, and microwave sintering.

Thermal sintering consists of heating the metal ink typically at a temperature above 200° C.; alternatively, above 500° C. Electrical sintering consists of applying a current through the deposited and dried ink and allowing resistive heating to selectivity heat the deposited ink. Photonic sintering consists of exposing the conductive ink to actinic radiation typically in the 100 to 1500 nm wavelength to heat the deposited and dried ink. When wavelengths of 100-800 nm are employed the heating is typically accomplished through selective absorbance of the conductive particles in the ink, while at wavelengths of 800-1500 nm the energy absorbance is less selective. The photonic sintering may be accomplished by a laser that can be focused onto the deposited ink or by lamps, including high intensity pulsed lamps that are less selective in the area exposed. Plasma sintering consists of exposing the deposited and dried ink to a low pressure plasma. Microwave sintering consists of exposing the deposited and dried ink to microwave radiation.

Chemical sintering consists of exposing the deposited and dried ink to a chemical agent, such as halogenated materials either as salts of acids. Several specific examples among many examples of halogen salts are NaCl and $MgCl_2$, while one specific example of a halogen acid is HCl. Those skilled in the art will recognize that other halogens salts or acids can be effective for chemical sintering.

According to another aspect of the present disclosure a 3-D printed device comprising one or more interconnect structures is provided that comprises a plurality of conductive particles and one or more diblock or triblock polymers as previously described above. An example of such a device is a digital phased array where advances in solid-state electronics have enabled system-on-chip designs where there is a mixture of both digital and RF functions. The integration of these components can require interconnect structures that are significantly larger that the device itself. This is especially true for impedance matching and mode transitioning structures that operate at larger percent bandwidth. Here 3-D printing would enable direct integration of the chip within the radiating elements without the need for additional interconnections. The final system will use subtractive manufacturing techniques to fabricate the gross structure and 3D printing for the fine internal RF structures.

The conductive ink composition may also be used for printing complex RF devices, for example, antennas. The conductive ink composition may also be used for printing microfluidic devices that contain conductive wires where current 3-D printing of complex multilevel devices with such conductive wires is not possible. The advantages of the conductive ink composition and the 3-D printing thereof include high resolution and conductivity without need to be exposed to a post processing sintering treatment.

The following specific examples are given to illustrate the conductive ink compositions, formed according to the teachings of the present disclosure, as well as the 3-D printing of such inks along with the properties associated therewith and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Example 1—Ink Compositions

Materials—Silver particle 5-8 μm (47MR-11F) and 2-4 μm (47MR-10F) flakes were purchased from Inframat Advanced Materials, Manchester, Conn. Copper particle 1-5 μm flakes (213665), Aluminum particle 11 μm flakes (128475) were purchased from Beantown Chemical, Hudson, N.H. Gold particle 3-5 μm flakes (42152) and Tetralin (A14962) were purchased from Alfa Aesar, Tewksbury, Mass. Polystyrene-block-polyisoprene-block-polystyrene (SIS) (4324-15), polystyrene-block-poly(ethylene-ran-butylene)-block-polystyrene (SEBS) (200565), and polystyrene-block-polybutadiene-block-polystyrene (SBS) (432490) were purchased from Sigma-Aldrich, St. Louis, Mo. Toluene (9466) and Xylenes (9490) were purchased from Avantor, Inc., Center Valley, Pa. Anisole (123226), p-Cymene (C121452), 1,2-Dichlorobenzene (D56802), and Mesitylene (M7200) were purchased from Sigma-Aldrich, St. Louis, Mo. All materials were used as purchased without further purification or modification.

Ink Compositions—Printable inks were formed by combining copolymers, conductive particles, and solvent in an AR-100 planetary centrifugal mixer (Thinky USA, Laguna Hills, Calif.). The copolymers and solvent were combined in a 20 mL glass vial and mixed until the copolymers were fully dissolved. The particles were then added and the inks were loaded into the mixer and spun at 2200 RPM for 20 minutes. If a homogeneous ink was not obtained the ink was hand mixed to disperse inhomogeneities followed by an additional cycle in the planetary centrifugal mixer at 2200 RPM for 20 minutes. This mixing cycle was repeated until a homogeneous ink was obtained. The conductive ink compositions are further described below in Table 1.

TABLE 1

Conductive ink formulations showing materials and weight ratios.

| Ink ID # | Polymer | Parts | Solvent | Parts | Particle | Particle Size | Parts |
|---|---|---|---|---|---|---|---|
| 376 | SIS | 25 | Toluene | 50 | Silver | 5-8 μm | 425 |
| 377 | SIS | 31 | Toluene | 44 | Silver | 5-8 μm | 425 |
| 380 | SIS | 31 | Toluene | 44 | Silver | 5-8 μm | 475 |
| 381 | SIS | 25 | Toluene | 50 | Silver | 5-8 μm | 485 |
| 384 | SEBS | 25 | Toluene | 50 | Silver | 5-8 μm | 475 |
| 385 | SEBS | 19 | Toluene | 56 | Silver | 5-8 μm | 485 |
| 386 | SEBS | 19 | Xylenes | 56 | Silver | 5-8 μm | 475 |
| 398 | SIS | 25 | Tetralin | 56 | Silver | 5-8 μm | 425 |
| 399 | SIS | 25 | Tetralin | 45 | Silver | 5-8 μm | 425 |
| 400 | SIS | 25 | Tetralin | 50 | Silver | 5-8 μm | 425 |
| 406 | SIS | 26 | Tetralin | 71 | Silver | 2-4 μm | 425 |
| 407 | SIS | 26 | Tetralin | 63 | Silver | 2-4 μm | 425 |
| 408 | SIS | 25 | Tetralin | 50 | Silver | 2-4 μm | 425 |
| 409 | SBS | 25 | Toluene | 50 | Silver | 5-8 μm | 425 |
| 416 | SIS | 25 | Tetralin | 65 | Copper | 1-5 μm | 425 |
| 417 | SIS | 25 | Tetralin | 83 | Aluminum | 11 μm | 100 |
| 418 | SIS | 25 | Tetralin | 50 | Gold | 3-5 μm | 425 |
| 425 | SIS | 40 | Tetralin | 80 | Silver | 5-8 μm | 380 |
| 426 | SIS | 15 | Tetralin | 30 | Gold | 3-5 μm | 455 |
| 441 | SIS | 25 | Anisole | 51 | Silver | 2-4 μm | 425 |
| 442 | SIS | 25 | p-Cymene | 44 | Silver | 2-4 μm | 425 |
| 443 | SIS | 25 | 1-2, Dichlorobenzene | 67 | Silver | 2-4 μm | 425 |
| 444 | SIS | 25 | Mesitylene | 45 | Silver | 2-4 μm | 425 |
| 445 | SIS | 25 | Toluene | 45 | Silver | 2-4 μm | 425 |

Example 2—Ink Rheology

The inks' rheological properties were characterized on a DHR-2 Rheometer (TA Instruments, New Castle, Del.) using 40 mm and 20 mm cone-and-plate geometries. Modulus and yield stress were determined by an amplitude sweep at a frequency of 10 rad/s. Yield stress was defined as the point where the value of the storage modulus dropped below that of the loss modulus. Shear thinning rheology was demonstrated by measuring viscosity at a wide range of steady shear rates. A material with a shear thinning threshold of less than or equal to 0.02 rad/s is an indication that the ink will have shear thinning behavior appropriate for 3-D printing of objects by solvent casting. A material with a thinning region determined by the slope of log(n)/log(y) with a slope of less than or equal to −0.25 is also an indication that the ink will have shear thinning behavior appropriate for 3-D printing of objects by solvent casting. Both the thinning threshold and thinning region must be in the appropriate ranges for to be applicable for 3-D printing of objects by solvent casting. Results from rheology measurements of conductive ink compositions of Experiment 1 are provided below in Table 2.

TABLE 2

Results from rheology measurements of conductive ink compositions.

| Ink ID # | Thinning Threshold (rad/s) | Thinning Region (log($\eta$)/log($\dot{\gamma}$)) |
|---|---|---|
| 376 | 0.010 | −0.920 |
| 377 | 0.005 | −0.605 |
| 380 | <0.001 | −0.725 |
| 381 | 0.005 | −0.811 |
| 384 | 0.010 | −0.546 |

TABLE 2-continued

Results from rheology measurements of conductive ink compositions.

| Ink ID # | Thinning Threshold (rad/s) | Thinning Region (log(η)/log(γ')) |
|---|---|---|
| 385 | 0.010 | −0.592 |
| 386 | <0.001 | −0.608 |
| 398 | <0.001 | .0.862 |
| 399 | 0.010 | −0.728 |
| 400 | <0.001 | −0.874 |
| 406 | <0.001 | −0.787 |
| 407 | <0.001 | −0.842 |
| 408 | <0.001 | −0.436 |
| 409 | 0.015 | −0.692 |
| 416 | 0.006 | −1.094 |
| 417 | <0.001 | −0.375 |
| 418 | 0.004 | −0.325 |

The example demonstrates that for a variety of ratios of particles, copolymers, and solvents, the inks containing conductive particles and any of the three triblock copolymers have a thinning threshold that is below 0.02 rad/s. The results also show that all of the above inks have a thinning region that is well below to −0.25. This demonstrates that inks composed of a variety of conductive particles and triblock copolymers have the correct rheology to undergo shear thinning during solvent cast 3-D printing. The results also demonstrate that a variety of solvent to polymer to particle ratios can be employed to 3-D print by solvent casting.

Example 3—Printing of Interconnect Structures

The conductive ink compositions of Example 1 were prepared, loaded into syringes, and mounted onto a customized Hyrel 3-axis printing stage. Each conductive ink composition was dispensed from a 3 cc syringe placed in an HP7× high pressure adapter, purchased from Nordson EFD, mounted onto the gantry of the printing stage. Air pressure to the Aerotech printer was supplied by house air through a Nordson EFD Ultimus V controller.

The inks were used to print interconnect structures (e.g., wire filaments) with the nozzle size, print speed, and pressure to which the ink was subjected being described below in Table 3. This example demonstrates that all conductive particle containing ink compositions can be used to 3-D print interconnect structures (e.g., wire filaments). In addition, the results demonstrate that a variety of conductive particles, copolymers, and solvents, as well as copolymer to solvent to particle ratios can be employed to 3-D print by solvent casting. The particle size is further demonstrated to be variable. Finally, the results also demonstrate that 3-D printed objects or interconnect structures can be printed with a resolution down to 100 μm.

TABLE 3

Summary of conductive inks and printing conditions employed to print solid interconnect structures.

| Ink Id # | Nozzle Size (μm) | Print Speed (mm/s) | Pressure (PSI) |
|---|---|---|---|
| 376 | 200 | 4 | 95 |
| 377 | 200 | 4 | 126 |
| 380 | 200 | 4 | 175 |
| 381 | 200 | 4 | 203 |
| 384 | 200 | 4 | 455 |
| 385 | 200 | 4 | 116 |
| 386 | 200 | 4 | 105 |
| 398 | 200 | 4 | 49 |
| 399 | 200 | 4 | 64 |
| 400 | 200 | 4 | 60 |
| 406 | 200 | 4 | 67 |
| 406 | 100 | 4 | 140 |
| 407 | 200 | 4 | 112 |
| 407 | 100 | 4 | 154 |
| 408 | 200 | 4 | 245 |
| 408 | 100 | 4 | 175 |
| 409 | 200 | 4 | 210 |
| 416 | 200 | 4 | 245 |
| 417 | 200 | 4 | 18 |
| 418 | 200 | 4 | 35 |
| 425 | 200 | 4 | 21 |
| 426 | 200 | 4 | 98 |

Example 4—Resistivity Measurements

The resistance of the printed and dried conductive inks was measured using a four-wire resistance measurement made on a digital multimeter purchased from BK Precision (5492B). To achieve this, thin films of aluminum (100 nm) were deposited on glass microscope slides (Thermo Scientific, 12-549-3) in 4 strips down the length of the slide. A wire filament (e.g., interconnect structure) was then printed using the conductive ink composition across the width of the slide and the slide was left to dry. The product of this process is depicted in FIG. 2.

The resistance of the wire filament was then measured using the four-wire technique, with electrical leads in contact with the aluminum strips at the edge of the glass. A profilometer (Bruker DektakXT) was used to measure the cross-sectional area of the wire filament. Conductivity of the ink was then calculated using Equation 1:

$$\text{Conductivity} = L/R \times A \quad \text{(Eq. 1)}$$

where L is the length between the two center strips of FIG. 1, R is the measured resistance, and A is the area of the printed wire filament.

The results from these resistivity measurements are shown in Table 4, noting that inks 408A and 408B are the same formulations measured at different times. The results of this example demonstrate that all gold and silver containing ink formulations have low resistivity and high conductivity without the need for any additional post-processing sintering treatment. This example further demonstrates that these conductive ink compositions are compatible with and can be used as conductors in high-resolution, complex, polymer-based devices. These results further demonstrate that inks containing particles of different sizes will also exhibit high conductivity, allowing their use as conductors in polymer-based systems.

TABLE 4

Summary of resistivity and conductivity data from printed and dried wire filaments of the 3D inks.

| Ink Id # | Particle | Particle Size | Resistivity ($\Omega$ m $*10^{-7}$) | Conductivity (S/m $*10^5$) |
|---|---|---|---|---|
| 376 | Silver | 5-8 μm | 8.9 | 11.2 |

TABLE 4-continued

Summary of resistivity and conductivity data from printed and dried wire filaments of the 3D inks.

| Ink Id # | Particle | Particle Size | Resistivity ($\Omega$ m *$10^{-7}$) | Conductivity (S/m *$10^5$) |
|---|---|---|---|---|
| 377 | Silver | 5-8 μm | 7.5 | 13.4 |
| 380 | Silver | 5-8 μm | 5.6 | 17.9 |
| 381 | Silver | 5-8 μm | 16.2 | 6.2 |
| 384 | Silver | 5-8 μm | 4.4 | 22.9 |
| 385 | Silver | 5-8 μm | 17.6 | 5.7 |
| 386 | Silver | 5-8 μm | 13.4 | 7.5 |
| 398 | Silver | 5-8 μm | 3.9 | 25.5 |
| 399 | Silver | 5-8 μm | 3.1 | 32.2 |
| 400 | Silver | 5-8 μm | 2.6 | 37.7 |
| 406 | Silver | 2-4 μm | 10.9 | 9.2 |
| 407 | Silver | 2-4 μm | 4.8 | 21.0 |
| 408A | Silver | 2-4 μm | 1.8 | 56.8 |
| 408B | Silver | 2-4 μm | 2.6 | 38.4 |
| 409 | Silver | 5-8 μm | 7.5 | 13.4 |
| 416 | Copper | 1-5 μm | >$10^8$ | <$10^{-6}$ |
| 417 | Aluminum | 11 μm | 246000 | 0.00041 |
| 418 | Gold | 3-5 μm | 44.5 | 2.3 |
| 425 | Silver | 5-8 μm | 14.0 | 7.1 |
| 426 | Gold | 3-5 μm | 8.3 | 12.0 |
| 441 | Silver | 2-4 μm | 6.5 | 15.3 |
| 442 | Silver | 2-4 μm | 6.7 | 14.8 |
| 443 | Silver | 2-4 μm | 5.5 | 18.3 |
| 444 | Silver | 2-4 μm | 14.0 | 7.2 |
| 445 | Silver | 2-4 μm | 9.8 | 10.2 |

Example 5—Root Mean Square (RMS) Surface Roughness Measurements

The RMS surface roughness was measured for inks of similar composition that differed by the solvent employed in the ink formulation. The RMS surface roughness was measured employing a Dimension ICON atomic force microscope (AFM) using soft tapping mode. Multiple scans were made of 80×20 μm areas of printed lines and RMS roughness was calculated. Not to be bound by theory, it was expected that a lower rate of solvent loss from the printed ink would lead to reduced RMS surface roughness and that decreased RMS surface roughness would lead to increased conductivity. The results from these RMS surface roughness measurements are shown in Table 5 noting that Ink 408A and 408B are the same ink formulations measured at different times.

TABLE 5

Summary of RMS surface roughness, conductivity data from printed wire filaments of the 3D inks alone with solvent properties.

| Ink Id # | Solvent | Boiling Point (° C.) | Vapor Pressure @ 20 C. (mmHg) | Evaporation Rate (NBAC = 1.00) | RMS Surface Roughness (nm) | Conductivity (S/m *$10^5$) |
|---|---|---|---|---|---|---|
| 408A | Tetralin | 208 | 0.18 | 0.035 | 682 | 56.8 |
| 408B | Tetralin | 208 | 0.18 | 0.035 | 767 | 38.4 |
| 441 | Anisole | 154 | 2.4 | 0.322 | 987 | 15.3 |
| 442 | Cymene | 177 | 1.5 | 0.14 | 836 | 14.8 |
| 443 | Dichlorobenzene | 180 | 1.2 | 0.165 | 786 | 18.3 |
| 444 | Mesitylene | 165 | 2 | 0.224 | 893 | 7.2 |
| 445 | Toluene | 111 | 22 | 2.00 | 1504 | 10.2 |

The results show that the RMS surface roughness is positively correlated with the solvent's vapor pressure and evaporation rate in that increasing either the solvent's vapor pressure or evaporation rate lead to in an increase in RMS surface roughness. The RMS surface roughness is negatively correlated with the solvent's boiling point in that an increasing the solvents boiling point lead to a decrease in the RMS surface roughness. This shows that RMS surface roughness can be manipulated by the choice of solvent and that a lower rate of solvent loss from the printed ink leads to lower RMS surface roughness.

The results also show that there is a rough negative correlation between RMS surface roughness and conductivity in that decreasing the RMS surface roughness leads to an increase in conductivity. This increase is most pronounced when the RMS surface roughness is less than 800 nm. This results shows that all solvents can give a conductive ink that does not require high temperature annealing to give conductivity. The results also show that solvents with high boiling points or low vapor pressures or low evaporation rates can give inks with increased conductivity relatively to other solvents that can be employed in the formulations. The results also show that decreasing the RMS surface roughness will lead to increased conductivity and that any method employed in the printing process that reduces the RMS surface roughness can be employed to produce higher conductivity printed inks.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An extrudable conductive ink composition comprising a plurality of metal flakes having an aspect ratio defined by lengths in the x-, y-, and z-dimensions, such that the metal flakes have a z-dimension that is no more than 20% of the x-dimension and no more than 20% of the y-dimension, wherein said plurality of metal flakes is dispersed in a solvent along with one or more solubilized diblock or triblock copolymers; the diblock or triblock copolymers having an A-B, A-B-A, or A-B-C block-type structure in which the A-blocks and C-blocks are an aromatic-based polymer or an acrylate-based polymer and the B-blocks are an aliphatic-based polymer, wherein the extrudable conductive ink composition exhibits high shear thinning such that the composition presents a low viscosity when passed through an extrusion nozzle and a higher viscosity upon deposition, wherein said plurality of metal flakes have a particle size in both x and y dimensions in a range of about 2 micrometers to about 15 micrometers.

2. The conductive ink composition of claim 1, wherein the weight percentage of said metal flakes in the ink composition is between about 80% and 90%.

3. The conductive ink composition of claim 1, wherein the solvent comprises a hydrocarbon solvent.

4. The conductive ink composition of claim 1, wherein the solvent comprises an aromatic hydrocarbon solvent, or a bicyclic aromatic hydrocarbon solvent or tetralin.

5. The conductive ink composition of claim 1, wherein the solvent has a vapor pressure less than 5-mm Hg at 20° C.

6. The conductive ink composition of claim 1, wherein the solvent has an evaporation rate of less than 0.5.

7. The conductive ink composition of claim 1, wherein the conductive ink composition further comprises a curable vinyl-containing monomer or mixture of vinyl-containing monomers.

8. The conductive ink composition of claim 1, wherein the conductive ink composition further comprises a thermal or photo-induced free radical generator adapted to generate free radicals when subjected to heat or actinic radiation.

9. The conductive ink composition of claim 1, wherein the conductive ink composition further comprises at least one of a sensitizer, a dye, a surfactant, a stabilizer, a colorant, an ultraviolet absorber, an antioxidant, or a defoaming agent.

10. The conductive ink composition of claim 1, wherein the conductive ink composition further comprises at least one homopolymer, copolymer, terpolymer, or higher polymer in addition to the one or more diblock or triblock copolymers.

11. The conductive ink composition of claim 1, wherein the weight percentage of the metal flakes in the ink composition is between about 85% and 90%.

12. The conductive ink composition of claim 1, wherein the solvent has a vapor pressure less than 2 mm Hg at 20° C.

13. The conductive ink composition of claim 1, wherein the solvent has a vapor pressure less than 1 mm Hg at 20° C.

14. The conductive ink composition of claim 1, wherein the solvent has a vapor pressure less than 0.5 mm Hg at 20° C.

15. The conductive ink composition of claim 1, wherein the solvent has an evaporation rate of less than 0.1.

16. The conductive ink composition of claim 1, wherein the composition exhibits a shear thinning threshold of less than or equal to 0.02 rad/s.

17. The conductive ink composition of claim 1, wherein the metal flakes comprise any of silver and gold.

* * * * *